Oct. 7, 1958     L. F. KOCHER     2,855,519
TAMPERPROOF FILM BADGE
Filed Sept. 20, 1957
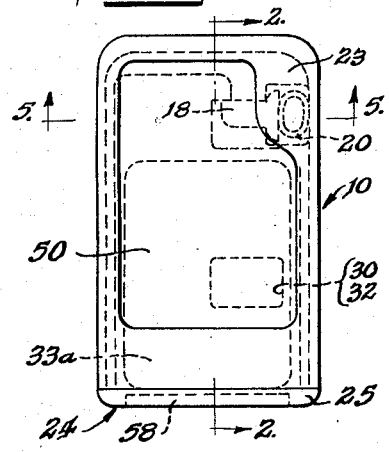
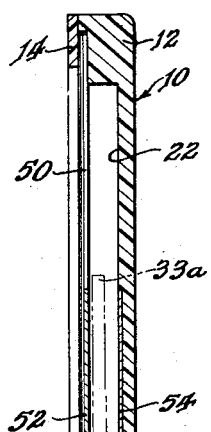
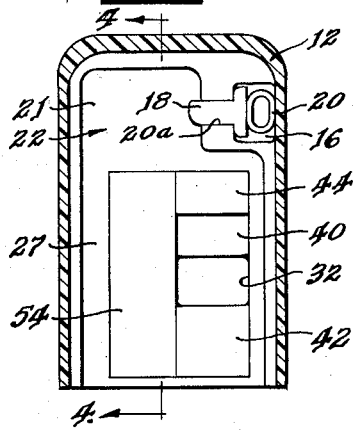
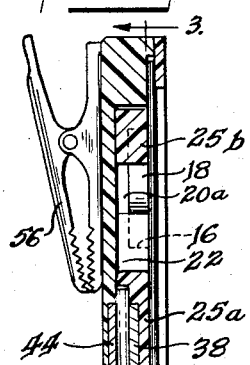
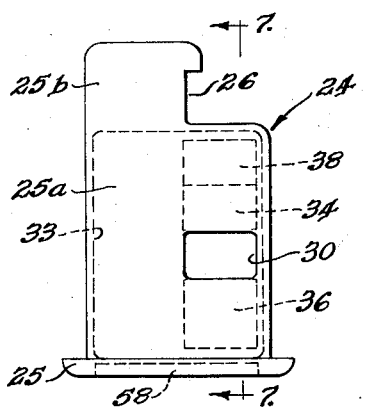
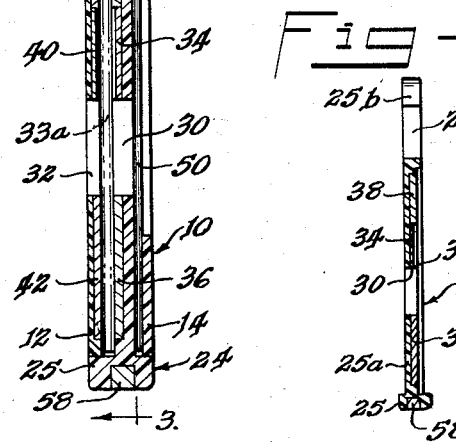
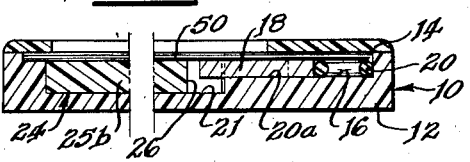
INVENTOR.
Leo F. Kocher
BY
Roland G. Anderson
Attorney

# United States Patent Office 2,855,519
Patented Oct. 7, 1958

2,855,519

TAMPERPROOF FILM BADGE

Leo F. Kocher, Richland, Wash., assignor to the United States of America as represented by the United States Atomic Energy Commission Application September 20, 1957, Serial No. 685,356

9 Claims. (Cl. 250—68)

This invention relates to a film badge of the type worn by personnel in areas where potentially deleterious levels of radiation exist. More particularly, it relates to a film badge that has a novel locking mechanism and is lightweight and tamperproof.

Since the birth of the nuclear art in recent years, various means have been employed to protect operating personnel from the deleterious effects of irradiation. Radiation shields interposed between sources of radiation and their surroundings have been effective in preventing lethal doses of radiation from communicating with human beings within the ambit of the sources. However, radiation shields do not provide total attenuation of radiation, and therefore it has been necessary from health considerations to monitor the radiation exposure of persons working in areas adjacent to radiation sources. Since the cumulative effects of repeated small doses of radiation may be as harmful as a single larger dose, it is mandatory that a person's total cumulative exposure be known as well as his instantaneous exposure to radiation. The most common means of affording the aforementioned monitoring has been through the use of film badges worn on the clothing of the person under exposure. Such film badges generally consist of a casing adapted to contain a film that is sensitive to the types of radiation ordinarily encountered by those in the nuclear field, namely, alpha, beta, and gamma radiation, and neutrons.

Several types of film badges have been designed and are presently in use. However, none of them is ideal, there being undesirable limitations inherent in all commercially available film badges.

One particular limitation of present day film badges is that they are not tamperproof. Personnel, curious to investigate the construction and contents of their film badges, often dismantle them and expose the film outside of the shielding of the badge to sunlight and other types of radiation. Since accurate measurements of radiation exposure require that the film be kept within the badge so that standard calibration curves may be employed to correlate quantitatively the film density or darkness to radiation exposure, the benefits of wearing the film badge are thereby lost. Several means have been devised to cope with tampering by curious wearers. For example, some film badges require special tools for dismantling to remove the film. Badges that require these special tools are usually very slow and expensive to process. Additionally, such badges are not truly tamperproof, for in time the wearers discover methods for dismantling them without the intended special tool by using pliers, screw drivers, etc.

In addition to being subject to investigation and possible film spoilage due to the curiosity of the wearer, present day film badges are disadvantageous in other ways also. For example, most film badges are heavy and bulky thereby causing distortion and renting of the clothing of the wearer. The mass and bulk of present film badges also causes discomfort to the wearer.

Another disadvantage and limitation of present day film badges lies in the means of identifying the film with the wearer. Many film badges contain a film pack that requires manual marking, such marking often being obliterated due to handling or difficult to read because of poor penmanship. Manual marking also may cause the covering of the film pack to rupture due to the sharpness of the marking instrument.

It was in view of the aforementioned limitations, disadvantages, and areas for improvement that the film badge of the present invention was developed.

One of the objects of the present invention, therefore, is to provide a film badge for use by personnel in areas where potentially deleterious levels of radiation exist that will be truly tamperproof against the ordinarily accessible means that such personnel have at their disposal.

A second object of this invention is to provide a lightweight, comfortable film badge.

A further object of this invention is to provide a film badge in which positive means for identifying the film with the badge wearer are incorporated, thus eliminating the possibility of human error in correlating the wearer of the film badge with its film after removal from the badge for processing.

Still another object of this invention is to provide a film badge that carries a picture of the wearer.

Other objects of this invention will become apparent from the following specification and the accompanying drawings in which:

Fig. 1 is a front view of the film badge of the present invention;

Fig. 2 is a sectional view taken along line 2—2 of Fig. 1;

Fig. 3 is a sectional view taken along line 3—3 of Fig. 2 with the slide removed from the film badge;

Fig. 4 is a sectional view taken along line 4—4 of Fig. 3;

Fig. 5 is a sectional view taken along line 5—5 of Fig. 1;

Fig. 6 is a front view of the slide of the film badge; and

Fig. 7 is a sectional view taken along line 7—7 of Fig. 6.

The film badge of the present invention comprises a sheath 10 having a back portion or body 12 and a front portion in the form of an open frame 14. In a well 16 in body 12 are located the head of a T-shaped ferromagnetic key 18 and a flexible annular positioner 20 which is somewhat compressed between the head of the key 18 and the outer side of the well 16 so as to urge the head of the key against the inner side of the well 16. The stem of the key 18 is slidably disposed in a groove 20a in the body 12 adjacent the inner side of the well 16 and projects into a relatively narrow and short portion 21 of an extensive depression 22 in the body 12 when the head of the key engages the inner side of the well 16. An ear 23 in a corner of the frame 14 holds the key 18 and positioner 20 in the well 16 and groove 20a.

As shown in Fig. 6, the film badge also comprises a slide 24 having an enlarged base 25, a relatively wide and long portion 25a, and a relatively narrow and short portion 25b provided with an indentation 26. When the slide 24 is fully inserted in the depression 22 in the body 12, the base 25 engages the end of the body 12, the portion 25b of the slide 24 lies over the portion 21 of the depression 22, the wide and long portion 25a of the slide lies over a relatively wide and long portion 27 of the depression, and the key 18 extends into the indentation 26. The slide 24 and the body 12 also have openings or windows 30 and 32, respectively, that register when the slide 24 is fully inserted in the sheath 10. The windows 30 and 32 are formed, respectively, on the wide portion 25a of the slide 24 and the wide portion 27 of the depression 22 in the body 12. The key 18 is beveled on one edge so that the key can be retracted to permit complete insertion of the slide 24 in the sheath 10. The opposite edge of the key 18 is straight or unbeveled so that it will not be retracted when an attempt is made to pull the slide out of the sheath 10. When the slide 24 is to be removed from the sheath 10, the key 18 is retracted from the indentation 26 in the slide 24 by a magnet applied to the exterior of the body 12 beyond the outer side of the well 16.

The body 12, frame 14, and slide 24 may be made of polyvinyl chloride. Other materials may be used for these parts, including metals when very high levels of radiation exposure are to be encountered.

The slide 24 has a depression 33 which covers most of the wide portion 25a, as shown in Fig. 6, and is adapted to receive a film pack 33a as shown in Fig. 2. Windows 30 and 32 formed in the slide 24 and the body 12, respectively, provide unimpeded paths for radiation to the film pack 33a from front and back. As shown in Fig. 6, the slide 24 carries silver shields 34 and 36 directly above and below the window 30 and also an aluminum shield 38 directly above the shield 34. The shields 34, 36, and 38 are affixed to the slide 24 in recesses in the depression 33 so as to be generally flush with the bottom thereof. As shown in Fig. 3, the body 12 carries silver shields 40 and 42 directly above and below the window 32 and an aluminum shield 44 directly above the shield 40. The shields 40, 42, and 44 are affixed to the body 12 in recesses in the depression 22 so as to be generally flush with the bottom thereof. When the slide 24 is fully inserted in the sheath 10, the shields 34, 36, and 38 register with the shields 40, 42, and 44, respectively, on opposite sides of the film pack 33a, as shown in Fig. 2.

A transparent jacket 50 for a photograph of the wearer of the film badge fits between the slide 24 and the frame 14. The jacket 50 may be made of cellulose acetate and should have on the side of the photograph facing the slide 24 an opening, not shown, in registry with the windows 30 and 32. As shown in Fig. 4, the jacket 50 also carries between the photograph and the side facing the depression 22 in the body 12, a lead tape 52 having the badge wearer's identification number or payroll number marked by perforations in the tape. The tape 52 registers with a lead tape 54 affixed to the body 12 in the depression 22 alongside the shields 40, 42, and 44. The purpose of the tapes 52 and 54 and the perforations in tape 52 is to cause radiation to which the film badge is exposed to darken the film at the perforations and thereby record the wearer's number.

An alligator clip 56, affixed to the body 12, will attach the film badge to the wearer's clothing. A thin, narrow, ferromagnetic bar 58, embedded within the base 25 of the slide 24, enables the slide 24 to be held and removed magnetically from the sheath 10.

The design of the specific film badge described and illustrated is such that information regarding the amount and the energy level of the beta and gamma radiation to which the wearer is exposed is recorded on the film contained therein. The window 30 in the slide 24 and the window 32 in the body 12 provide unimpeded paths for radiation to pass from regions outside of the badge to the area of the film pack 33a in registry with the windows. Soft or low energy beta radiation is prevented from reaching the film even at this relatively unshielded area due to the shielding of the wrapper on the film pack 33a. However, hard or high energy beta radiation penetrates the wrapper on the film pack 33a easily to darken the film. Gamma radiation also passes easily through the wrapper on the film pack 33a and causes darkening of the film at the area in registry with the windows 30 and 32. Thus this area of film will be affected by higher energy beta radiation and by gamma radiation of all energies, providing information as to the total beta and gamma radiation exposure of the wearer, excepting soft beta radiation which is not harmful and need not be monitored. Aluminum shields 38 and 44 and silver shields 34 and 40 are made to have the same density thickness, i. e., mass per unit area, so that they will all have the same shielding effect on beta radiation. This is due to the fact that the attenuation of beta radiation depends principally on the density thickness of the shield, rather than on its atomic composition. Since silver has a greater density than aluminum, silver shields 34 and 40 are thinner than aluminum shields 38 and 44. However, shields 34 and 40 will more severely attenuate gamma radiation than will shields 38 and 44, since shields 34 and 40 are made of silver, a material of higher atomic number than aluminum, the material of shields 38 and 44. Therefore, the area of the film in registry with shields 38 and 44 will be affected to a greater extent by gamma radiation than will the area of the film in registry with shields 34 and 40. In this way the contributions to the film density, or darkness, caused by gamma radiation can be separated from the contributions caused by beta radiation, since shields 34 and 40 attenuate beta radiation to the same degree as shields 38 and 44, but they discriminate more against gamma radiation than do shields 38 and 44. Silver shields 36 and 42 are thicker than silver shields 34 and 40 and will transmit only high energy gamma radiation to the area of the film in registry with shields 36 and 42. In this way a determination of exposure to gamma radiation having energies above a certain level can be made.

It will be appreciated that the ferromagnetic key 18 is located sufficiently inwardly from the periphery of the sheath 10 and the flexible positioner 20 is of adequate rigidity so that only a substantial magnetic force, such as might be caused by an electromagnet, is capable of attracting the key and compressing the positioner. Otherwise, curious personnel in possession of permanent magnets could dismantle their badges should they learn about the locking mechanism in their badges. There is, of course, no way for personnel to visually discover the locking mechanism since it is not perceptible when the badge is assembled. Even if personnel should learn of the locking mechanism, however, not knowing and not being able to see its exact location puts them at a serious disadvantage in attempting to open their badges, for the required magnetic force to be effective must be applied to the badge in the proper place and orientation.

It is to be noted that the ferromagnetic key 18 and the ferromagnetic bar 58 are located at opposite ends of the sheath 10 so that the magnetic force applied to the key will not interact with the magnetic force applied to the bar, and vice versa.

It should also be appreciated that the location of the locking mechanism at the closed end of the sheath 10 further enhances the inaccessibility of the locking mechanisms to tools and other instruments the badge wearer might have.

Modifications of the specific film badge described and illustrated here will no doubt occur to those skilled in the art. It is intended therefore to limit the present invention only by the scope of the appended claims.

What is claimed is:

1. A film badge comprising a sheath, a slide removably disposed within the sheath having an indentation, a ferromagnetic key slidably retained within the sheath, and a flexible positioner disposed within the sheath to make the key engage the indentation in the slide to retain it within the sheath, disengagement of the key from the indentation to permit removal of the slide from the sheath being caused by the application of a magnetic force in opposition to the flexible positioner.

2. A film badge as specified in claim 1, the slide being provided with a recess adapted to carry a film applicable thereto upon removal of the slide from the sheath.

3. A film badge as specified in claim 2, the badge further comprising a first radiation shield disposed within the sheath to register with a portion of the recess in the slide.

4. A film badge as specified in claim 3, the badge further comprising a second radiation shield disposed within the sheath to register with a portion of the recess in the slide other than the portion in registry with the first radiation shield, the second radiation shield having the same beta radiation absorption characteristics as the first radiation shield and different gamma radiation absorption characteristics than the first radiation shield.

5. A film badge as specified in claim 4, the badge further comprising a third radiation shield disposed within the sheath to register with a portion of the recess in the slide other than the portions of the recess in registry with the first and second radiation shields, the third radiation shield having different beta and gamma radiation absorption characteristics than the first and second radiation shields.

6. A film badge as specified in claim 5, the slide having a window in its recessed portion away from the radiation shields, the sheath having a window in registry with the window in the slide whereby radiation may pass generally unimpeded through the sheath and the slide to a film retained in the recess in the slide.

7. A film badge as specified in claim 1, the indentation being at an end of the slide inserted in the sheath, the slide having its opposite end enlarged and remaining outside the sheath and further having a bar of ferromagnetic material attached to the enlarged end of the slide, whereby the slide may be removed from the sheath by a magnet applied to the bar upon disengagement of the key from the indentation in the slide by another magnet applied to the exterior of the sheath at the key.

8. A film badge as specified in claim 7, the ferromagnetic key being T-shaped and the flexible positioner being an annulus of rubber-like material.

9. An assembly comprising a sheath having an open end and a closed end; a slide removably positioned in the sheath and having at one end an enlarged base at the open end of the sheath and outside thereof, a relatively wide and long portion projecting from the enlarged base into the sheath, and a relatively narrow and short portion projecting from the wide and long portion into proximity with the closed end of the sheath and being provided with an indentation; a ferromagnetic key slidably mounted in the sheath near its closed end so as to be engageable with the indentation; and a flexible positioner acting between the sheath and the key to urge the latter into engagement with the indentation.

References Cited in the file of this patent

UNITED STATES PATENTS

| | | |
|---|---|---|
| 2,624,846 | Tochilin et al. | Jan. 6, 1953 |
| 2,680,816 | Stern | June 8, 1954 |
| 2,753,460 | Reed et al. | July 3, 1956 |
| 2,789,232 | Block | Apr. 16, 1957 |